US008912264B2

(12) United States Patent
Funabiki et al.

(10) Patent No.: US 8,912,264 B2
(45) Date of Patent: Dec. 16, 2014

(54) AQUEOUS ETHYLENE/VINYL ALCOHOL COPOLYMER DISPERSION

(75) Inventors: Yuhei Funabiki, Himeji (JP); Norihiro Sugihara, Himeji (JP); Kazutoshi Terada, Kurashiki (JP); Yukio Ozeki, Tokyo (JP); Michiyuki Nanba, Tainai (JP)

(73) Assignees: Sumitomo Seika Chemicals Co., Ltd., Hyogo (JP); Kuraray Co., Ltd., Okayama (JP)

( * ) Notice: Subject to any disclaimer, the term of this patent is extended or adjusted under 35 U.S.C. 154(b) by 833 days.

(21) Appl. No.: 11/719,807

(22) PCT Filed: Nov. 25, 2005

(86) PCT No.: PCT/JP2005/021715
§ 371 (c)(1),
(2), (4) Date: Jul. 6, 2007

(87) PCT Pub. No.: WO2006/057351
PCT Pub. Date: Jun. 1, 2006

(65) Prior Publication Data
US 2009/0149593 A1   Jun. 11, 2009

(30) Foreign Application Priority Data
Nov. 25, 2004   (JP) ................................ 2004-340987

(51) Int. Cl.
C08K 3/34      (2006.01)
C08L 29/04     (2006.01)
C08L 23/08     (2006.01)
C08L 23/16     (2006.01)

(52) U.S. Cl.
CPC .......... *C08L 23/0861* (2013.01); *C08L 23/0876* (2013.01); *C08L 29/04* (2013.01); *C08L 23/16* (2013.01); *C08L 2205/02* (2013.01); *C08L 2205/03* (2013.01)
USPC ........... 524/442; 524/443; 524/444; 524/445; 524/446; 524/447; 524/503; 524/803

(58) Field of Classification Search
USPC .................. 524/503, 803, 442–447
See application file for complete search history.

(56) References Cited

U.S. PATENT DOCUMENTS

| | | | |
|---|---|---|---|
| 5,272,200 A | 12/1993 | Yamauchi et al. | |
| 5,302,417 A | 4/1994 | Yamauchi et al. | |
| 6,284,838 B1 | 9/2001 | Silbiger | |
| 6,364,987 B1 * | 4/2002 | Takada et al. | 156/244.11 |
| 6,444,751 B1 * | 9/2002 | Chujo et al. | 525/61 |
| 6,472,470 B1 * | 10/2002 | Fujiwara et al. | 525/61 |
| 7,939,599 B2 * | 5/2011 | Ding et al. | 524/803 |
| 2002/0143098 A1 * | 10/2002 | Kawai et al. | 524/503 |
| 2002/0182348 A1 * | 12/2002 | Fujiwara et al. | 428/35.2 |
| 2003/0092835 A1 * | 5/2003 | Kato et al. | 525/56 |
| 2005/0059778 A1 * | 3/2005 | Yanai et al. | 525/62 |
| 2007/0299194 A1 * | 12/2007 | Kawamura | 524/503 |

FOREIGN PATENT DOCUMENTS

| | | | |
|---|---|---|---|
| JP | 54-101844 | 8/1979 | |
| JP | 56-61430 | 5/1981 | |
| JP | 4-225008 | 8/1992 | |
| JP | 5-39392 | 2/1993 | |
| JP | 5-93009 | 4/1993 | |
| JP | 5-156028 | 6/1993 | |
| JP | 5-179001 | 7/1993 | |
| JP | 7-118471 | 5/1995 | |
| JP | 11-193340 | 7/1999 | |
| JP | 2002-212487 | 7/2002 | |
| JP | 2002-241671 | 8/2002 | |
| JP | WO03/025058 | * 3/2003 | ............ C08L 29/04 |
| WO | WO 98/06785 | 2/1998 | |
| WO | WO 03/025058 A1 | 3/2003 | |

OTHER PUBLICATIONS

English Translation of WO/03/025058.*
Yeun et al. Jurnal of Applied Polymer Science, vol. 101, pp. 591-596. 2006.*
Murakami et al. International Journal of Pharmaceutics 149 (1997) pp. 43-49.*
Office Action received in CN Application No. 200580040293.5, Date of Notification Jun. 19, 2009.

* cited by examiner

*Primary Examiner* — Mark Eashoo
*Assistant Examiner* — Michael A Salvitti
(74) *Attorney, Agent, or Firm* — Leydig, Voit & Mayer, Ltd.

(57) ABSTRACT

It is an object of the present invention to provide an aqueous ethylene-vinyl alcohol-based copolymer dispersion which is excellent in long-term storage stability and in film-forming properties even when subjected to low-temperature or short-time drying or applied to give thick coats and can give coatings showing high gas barrier performance. The prevent invention is an aqueous ethylene/vinyl alcohol-based copolymer dispersion, which comprises: (A) an ethylene/vinyl alcohol-based copolymer with an ethylene content of 15-65 mole percent and a degree of saponification of not lower than 80 mole percent, (B) a base-neutralized ethylene/α,β-unsaturated carboxylic acid-based copolymer and (C) a polyvinyl alcohol with a degree of saponification of 75-100 mole percent and a degree of polymerization of 100-3500, the content of the polyvinyl alcohol (C) being 0.5-100 parts by weight per 100 parts by weight of the ethylene/vinyl alcohol-based copolymer (A).

12 Claims, No Drawings

AQUEOUS ETHYLENE/VINYL ALCOHOL COPOLYMER DISPERSION

TECHNICAL FIELD

The present invention relates to an aqueous dispersion. More particularly, it relates to an aqueous ethylene/vinyl alcohol-based copolymer dispersion.

BACKGROUND ART

Ethylene/vinyl alcohol-based copolymers (hereinafter referred to as "EVOH" for short) obtained by saponifying ethylene/vinyl acetate copolymers or the like are particularly excellent in gas barrier properties against oxygen and other gases, aroma retention, oil resistance and chemical resistance and therefore are properly used in the form of various films, sheets, containers and like molded articles. They are also attracting attention as protective coating materials for metal surfaces, paper, wood and timber, among others. They are particularly excellent in gas barrier properties as compared with other resin films and therefore are very useful as food packaging materials such as films, sheets, laminates, hollow containers and the like, which are required to be capable of preventing the contents from being oxidized and/or the aroma from being lost.

As for the methods of molding EVOH into films and sheets, among others, the method comprising melt extruding or injection molding EVOH and the method comprising laminating EVOH films are generally and widely adopted. On the other hand, the technique of applying solutions or aqueous dispersions of EVOH, followed by drying has been proposed since they can form relatively thin coatings and can readily form coatings on hollow containers and other articles complicated in shape.

However, with the increase in EVOH solid content, EVOH solutions show increases in viscosity, making it difficult to use them; further, there are such problems as working environment deterioration by organic solvent evaporation in the coatings formation process and economic disadvantage due to the necessity of an apparatus for recovering the organic solvent, since the solutions comprises a organic solvent such as dimethyl sulfoxide or a mixed solvent composed of an alcohol and water. On the contrary, the method comprising applying an aqueous EVOH dispersion is considered as advantageous, hence expected, from the working environment and economic viewpoint, since the dispersion medium is water.

As regards aqueous EVOH dispersions, proposals have been made, for example, of a method of producing emulsified dispersions of a saponified ethylene/vinyl acetate copolymer which comprises dissolving a saponified ethylene/vinyl acetate copolymer with warming in the presence of an alcohol, water and a surfactant and emulsifying and dispersing the solution while removing the alcohol under forced high-speed stirring (Patent Document 1), a method of producing aqueous emulsified dispersions of saponified ethylene/vinyl acetate copolymers which comprises maintaining an emulsified dispersion of a saponified ethylene/vinyl acetate copolymer at a pH of not higher than 5.5 to thereby cause the emulsified dispersion to aggregate, filtering off the resulting aggregate and neutralizing the filtered aggregate obtained using a basic substance with stirring for redispersion (Patent Document 2), a method of producing aqueous emulsified EVOH dispersions which comprises emulsifying and dispersing a copolymer resulting from block-wise or graft-wise bonding between an EVOH component and an ionic group-containing component and insoluble in water at ordinary temperature (Patent Document 3), an aqueous dispersion comprising an ionic group-containing EVOH species as a dispersion stabilizer and EVOH as a dispersoid (Patent Document 4), a method of producing EVOH dispersions which comprises concentrating the resinous material by centrifugation during the process for producing EVOH dispersions (Patent Document 5), and an aqueous dispersion of a specific EVOH copolymer modified with a peroxide, for instance (Patent Document 6).

However, such aqueous EVOH dispersions have problems; namely they are poor in long-term storage stability or insufficient in film-forming properties.

On the other hand, an aqueous EVOH dispersion has been proposed in which a base-neutralized ethylene/α,β-unsaturated carboxylic acid copolymer is used as a dispersion stabilizer (Patent Document 7).

The above aqueous EVOH dispersion is excellent in long-term storage stability even at a high solid matter concentration and the coatings obtained therefrom are excellent in gas barrier properties. However, when the above dispersion is subjected to low-temperature or short-time drying or applied to give thick coatings having a thickness of 10 μm or thicker, for instance, a number of cracks appear on the coat surface, sometimes leading to inferior gas barrier properties; improvements in film-forming properties are demanded.

Patent Document 1: Japanese Kokai Publication Sho-54-101844
Patent Document 2: Japanese Kokai Publication Sho-56-61430
Patent Document 3: Japanese Kokai Publication Hei-04-225008
Patent Document 4: Japanese Kokai Publication Hei-05-93009
Patent Document 5: Japanese Kokai Publication Hei-05-179001
Patent Document 6: Japanese Kokai Publication Hei-07-118471
Patent Document 7: WO 03/025058

DISCLOSURE OF THE INVENTION

Problems which the Invention is to Solve

It is an object of the present invention to provide an aqueous ethylene/vinyl alcohol-based copolymer dispersion which is excellent in long-term storage stability and in film-forming properties even when subjected to low-temperature or short-time drying or applied to give thick coats and can give coatings showing high gas barrier performance.

Means for Solving the Object

Thus, the present invention relates to an aqueous ethylene/vinyl alcohol-based copolymer dispersion, which comprises: (A) an ethylene/vinyl alcohol-based copolymer with an ethylene content of 15-65 mole percent and a degree of saponification of not lower than 80 mole percent, (B) a base-neutralized ethylene/α,β-unsaturated carboxylic acid-based copolymer and (C) a polyvinyl alcohol with a degree of saponification of 75-100 mole percent and a degree of polymerization of 100-3500, the content of the polyvinyl alcohol (C) being 0.5-100 parts by weight per 100 parts by weight of the ethylene/vinyl alcohol-based copolymer (A).

In the following, the invention is described in detail.

The ethylene/vinyl alcohol-based copolymer (A) (hereinafter referred to as EVOH for short) to be used in the practice of the invention is obtained by copolymerizing ethylene with a vinyl ester such as vinyl acetate, vinyl formate, vinyl propionate, vinyl benzoate, vinyl trifluoroacetate or vinyl pivalate and then saponifying the copolymer obtained. If necessary, a content of 5% by weight or lower of a further copolymerizable monomer other than ethylene and the vinyl ester may be copolymerized.

As specific examples of the EVOH (A), there may be mentioned saponified ethylene/vinyl acetate copolymers, saponified ethylene/vinyl formate copolymers, saponified ethylene/vinyl propionate copolymers, saponified ethylene/vinyl benzoate copolymers, saponified ethylene/vinyl trifluoroacetate copolymers and saponified ethylene/vinyl pivalate copolymers, among others. The ethylene content in the EVOH (A) is 15-65 mole percent, preferably 25-45 mole percent, more preferably 25-35 mole percent. At ethylene content levels below 15 mole percent, the storage stability of the aqueous dispersion obtained may possibly be deteriorated. At ethylene content levels exceeding 65 mole percent, the coatings obtained may possibly show deteriorated gas barrier properties.

The degree of saponification of the EVOH (A) is not lower than 80 mole percent, preferably not lower than 95 mole percent, more preferably not lower than 97 mole percent. When the degree of saponification is lower than 80 mole percent, the gas barrier properties of the coatings obtained may become deteriorated.

The degree of polymerization of the EVOH (A) is generally 400-5000, preferably 700-2500, more preferably 700-1500, although a higher degree of polymerization is advantageous for the use of the aqueous dispersion by application to form coatings. When the degree of polymerization is lower than 400, the strength of the coatings obtained may possibly become decreased. The degree of polymerization of the EVOH (A) can be determined based on the intrinsic viscosity measured in a water/phenol mixed solvent (weight ratio 15/85) at 30° C.

As the ethylene/$\alpha,\beta$-unsaturated carboxylic acid-based copolymer (B) to be used in the practice of the invention, there may be mentioned ethylene/$\alpha,\beta$-unsaturated carboxylic acid copolymers, which are random copolymers or block copolymers of ethylene and an $\alpha,\beta$-unsaturated carboxylic acid, and ethylene/$\alpha,\beta$-unsaturated carboxylic acid/$\alpha,\beta$-unsaturated carboxylic acid ester copolymers, which are random copolymers or block copolymers of ethylene, an $\alpha,\beta$-unsaturated carboxylic acid and an $\alpha,\beta$-unsaturated carboxylic acid ester.

The above-mentioned $\alpha,\beta$-unsaturated carboxylic acid may be a monocarboxylic acid or a dicarboxylic acid and preferably has 3-5 carbon atoms.

As the $\alpha,\beta$-unsaturated carboxylic acid, there may be mentioned, for example, acrylic acid, methacrylic acid, crotonic acid, maleic acid, fumaric acid and itaconic acid, among others.

The above-mentioned $\alpha,\beta$-unsaturated carboxylic acid ester is preferably an ester corresponding to the ester form from such an $\alpha,\beta$-unsaturated carboxylic acid as mentioned above and an alcohol containing 1-10 carbon atoms. When the $\alpha,\beta$-unsaturated carboxylic acid is a dicarboxylic acid, the ester may be a monoester or diester.

As the $\alpha,\beta$-unsaturated carboxylic acid ester, there may be mentioned, for example, methyl acrylate, ethyl acrylate, butyl acrylate, hexyl acrylate, octyl acrylate, methyl methacrylate, ethyl methacrylate, butyl methacrylate, hexyl methacrylate, octyl methacrylate, monomethyl maleate, dimethyl maleate, methyl crotonate, monomethyl fumarate, dimethyl fumarate, monomethyl itaconate and dimethyl itaconate, among others.

As typical examples of the ethylene/$\alpha,\beta$-unsaturated carboxylic acid copolymers, there may be mentioned ethylene/acrylic acid copolymers, ethylene/methacrylic acid copolymers, ethylene/crotonic acid copolymers, ethylene/maleic acid copolymers, ethylene/fumaric acid copolymers and ethylene/itaconic acid copolymers, among others. Among these, ethylene/acrylic acid copolymers and ethylene/methacrylic acid copolymers are suitably used from the high dispersion stabilizing effect viewpoint.

As typical examples of the ethylene/$\alpha,\beta$-unsaturated carboxylic acid/$\alpha,\beta$-unsaturated carboxylic acid ester copolymers, there may be mentioned ethylene/acrylic acid/methyl acrylate copolymers, ethylene/acrylic acid/ethyl acrylate copolymers, ethylene/methacrylic acid/methyl methacrylate copolymers, ethylene/crotonic acid/methyl crotonate copolymers, ethylene/maleic acid/methyl maleate copolymers, ethylene/fumaric acid/methyl fumarate copolymers and ethylene/itaconic acid/methyl itaconate copolymers, among others. The $\alpha,\beta$-unsaturated carboxylic acid in such copolymers is preferably the same one as the $\alpha,\beta$-unsaturated carboxylic acid constituting the $\alpha,\beta$-unsaturated carboxylic acid ester in such copolymers. Among such copolymers, ethylene/acrylic acid/ethyl acrylate copolymers are suitably used from the high dispersion stabilizing effect viewpoint.

Those ethylene/$\alpha,\beta$-unsaturated carboxylic acid-based copolymers may be used singly or two or more of them may be used in combination.

The content of the $\alpha,\beta$-unsaturated carboxylic acid in the above-mentioned ethylene/$\alpha,\beta$-unsaturated carboxylic acid copolymers is not particularly restricted but, generally, it is desirably 5-30% by weight, preferably 15-25% by weight. When the $\alpha,\beta$-unsaturated carboxylic acid content is below 5% by weight, the dispersion stabilizing effect may possibly be little. When the $\alpha,\beta$-unsaturated carboxylic acid content is higher than 30% by weight, the water resistance and gas barrier properties of the coatings obtained may possibly be damaged.

The above-mentioned ethylene/$\alpha,\beta$-unsaturated carboxylic acid-based copolymers preferably have a weight average molecular weight of 5,000-100,000. While those copolymers having a molecular weight lower than 5,000 or higher than 100,000 may also be used as dispersants, they are unfavorable for practical use, since they are not produced on a commercial scale.

The degree of neutralization of the ethylene/$\alpha,\beta$-unsaturated carboxylic acid-based copolymers with a base is not particularly restricted but, generally, it is desirable that 30-100 mole percent, preferably 40-100 mole percent, more preferably 50-100 mole percent, of the carboxyl groups in the ethylene/$\alpha,\beta$-unsaturated carboxylic acid-based copolymer be neutralized. When the degree of neutralization is below 30 mole percent, the dispersion stabilizing effect may not be produced.

The base is not particularly restricted but, generally, there may be mentioned alkali metal hydroxides such as sodium hydroxide and potassium hydroxide, ammonia and organic amines, among others. Among them, alkali metal hydroxides such as sodium hydroxide and potassium hydroxide are preferably used from the viewpoint that the aqueous EVOH dispersions obtained are excellent in storage stability.

The amount of the base-neutralized ethylene/$\alpha,\beta$-unsaturated carboxylic acid-based copolymer (B) to be used in the practice of the invention is not particularly restricted but generally is 0.01-20 parts by weight, preferably 0.05-5 parts by weight, per 100 parts by weight of the EVOH (A). When the base-neutralized ethylene/$\alpha,\beta$-unsaturated carboxylic acid-based copolymer (B) is used in an amount smaller than 0.01 part by weight per 100 parts by weight of the EVOH (A), the dispersion stabilizing effect may not be produced. When the base-neutralized ethylene/α,β-unsaturated carboxylic acid-based copolymer (B) is used in an amount exceeding 20 parts by weight per 100 parts by weight of the EVOH (A), the coatings obtained may show deteriorations in gas barrier properties and/or water resistance, although such amount is effective in dispersion stabilization.

The degree of saponification of the polyvinyl alcohol (hereinafter referred to as PVA for short) (C) to be used in the practice of the invention is 75-100 mole percent, preferably 85-100 mole percent, more preferably 95-100 mole percent. When the degree of saponification is 75 mole percent or higher, the strength of the PVA (C) itself becomes high, serving to increase the strength of the coatings obtained and, further, the hygroscopicity of the PVA (C) itself becomes low, hence the influence of humidity is reduced; as a result, the coatings can show high gas barrier performance even in a high humidity atmosphere. When, on the other hand, the degree of saponification is lower than 75 mole percent, the strength of the PVC (C) itself is low, hence the strength of the coatings obtained becomes low; further, the hygroscopicity of the PVA (C) itself is high and the gas barrier performance is affected, so that the gas barrier performance of the coatings in a high humidity atmosphere may possibly become poor.

The degree of polymerization of the PVA (C) is 100-3500, preferably 300-2000. When the degree of polymerization is below 100, the addition of a large amount is required for improving the film-forming properties and this is uneconomical and, in addition, the addition of a large amount may possibly deteriorate the gas barrier properties of the coatings obtained. When the degree of polymerization is above 3500, the viscosity of the aqueous EVOH dispersion becomes high and, further, the storage stability decreases, possibly resulting in a tendency toward gelation during long-term storage.

The degree of polymerization of the PVA (C) so referred to herein means the viscosity average degree of polymerization and can be measured according to JIS K 6726. Thus, it can be determined from the limiting viscosity [η] measured in water at 30° C. after re-saponification and purification of the PVA, according to the following formula:

$$\text{Degree of polymerization} = ([\eta] \times 10^3 / 8.29)^{(1/0.62)}.$$

The amount of the PVA (C) to be used in the practice of the invention is 0.5-100 parts by weight, preferably 0.5-50 parts by weight, more preferably 1-30 parts by weight, per 100 parts by weight of the EVOH (A). When the PVA (C) is used in an amount smaller than 0.5 part by weight per 100 parts by weight of the EVOH (A), no improvement in film-forming properties may be brought about. When the PVA (C) is used in an amount larger than 100 parts by weight per 100 parts by weight of the EVOH (A), the coatings obtained become susceptible to humidity, so that the gas barrier properties may deteriorate; further, the aqueous EVOH dispersion becomes highly viscous, so that the storage stability may decrease.

As the method of producing the aqueous EVOH dispersion according to the invention, there may be mentioned, for example, the production method comprising adding the PVA (C) to an aqueous dispersion of the EVOH (A), followed by mixing up. The technique of blending the aqueous dispersion of the EVOH (A) with the PVA (C) is not particularly restricted but mention may be made of the technique comprising adding the PVA (C) to an aqueous dispersion of the EVOH (A) and then dissolving and dispersing; and the technique comprising blending an aqueous dispersion of the EVOH (A) with an aqueous solution of the PVA (C) in which the PVA (C) was dissolved in advance, for instance. In the practice of the invention, the technique comprising blending an aqueous dispersion of the EVOH (A) with an aqueous solution of the PVA (C) is preferably used in view of the ease of dissolution and dispersion into the aqueous dispersion of the EVOH (A) and from the ease of handling viewpoint.

The method of producing the aqueous dispersion of the EVOH (A) is not particularly restricted but any of the methods known in the art can be utilized. For example, there may be mentioned the method comprising dissolving the EVOH (A) and the base-neutralized ethylene/α,β-unsaturated carboxylic acid-based copolymer (B) in a mixed solvent composed of water and a water-soluble organic solvent, then cooling the solution for precipitation and thereafter removing the solvent; the method comprising dissolving, with heating, the EVOH (A) and the base-neutralized ethylene/α,β-unsaturated carboxylic acid-based copolymer (B) in an organic solvent in which they are soluble at elevated temperatures but insoluble at low temperatures, then cooling the solution obtained for precipitation and dispersion and thereafter substituting water for the solvent; and the method comprising bringing a solution of the EVOH (A) and the base-neutralized ethylene/α,β-unsaturated carboxylic acid-based copolymer (B) into contact with a poor solvent or cooling the solution, filtering off the resulting precipitate particles and dispersing the particles obtained in water.

Preferably used as the method of producing the above-mentioned aqueous EVOH dispersion in the practice of the invention is the method comprising dissolving the EVOH (A) and the base-neutralized ethylene/α,β-unsaturated carboxylic acid-based copolymer (B) in a mixed solvent composed of water and a water-soluble organic solvent, then cooling the solution for precipitation and thereafter removing the solvent. More specifically, the EVOH (A) as a dispersoid and the base-neutralized ethylene/α,β-unsaturated carboxylic acid-based copolymer (B) as a dispersion stabilizer are dissolved in a mixed solvent composed of water and a water-soluble organic solvent at 50-90° C. with stirring, and the solution is then cooled to −10 to 30° C. to cause precipitation and dispersion of the EVOH (A) in the form of particles with an average particle diameter of not greater than 1 μm, preferably not greater than 0.5 μm. So long as it is within the above range, the average particle diameter may be not smaller than 0.03 μm, preferably not smaller than 0.05 μm. Thereafter, an adequate amount of water is added according to need, and the water-soluble organic solvent and water are removed at ordinary pressure or under reduced pressure, whereupon an aqueous dispersion of the EVOH (A) at a desired solid matter concentration can be obtained.

As the mixed solvent for dissolving the EVOH (A), there may be mentioned mixed solvents composed of water and an alcohol such as methyl alcohol, ethyl alcohol, n-propyl alcohol, isopropyl alcohol, ethylene glycol, propylene glycol or glycerin; a phenol such as phenol or cresol; an amine such as ethylenediamine, trimethylenediamine; or such a water-soluble organic solvent as dimethyl sulfoxide, dimethylacetamide or N-methylpyrrolidone. Among them, water/alcohol mixed solvents, in particular water/methyl alcohol, water/ethyl alcohol, water/n-propyl alcohol and water/isopropyl alcohol, are suitably used.

The solid matter concentration of the aqueous EVOH dispersion according to the invention which comprises the EVOH (A), the base-neutralized ethylene/α,β-unsaturated carboxylic acid-based copolymer (B) and the PVA (C) is generally not lower than 10% by weight, preferably not lower than 15% by weight. While there is no particular upper limit to the solid matter concentration, an extremely high concentration leads to decreased storage stability of the dispersion and sometimes leads to an increased viscosity and, therefore, the upper limit is generally set at a level not higher than 50% by weight, preferably not higher than 40% by weight.

Since the aqueous EVOH dispersion of the invention contains the PVA (C), the aqueous EVOH dispersion, when applied to various substrates or base materials, followed by low-temperature or short-time drying, or when applied to give thick coatings, can provide coatings having no cracks or like defects and having improved gas barrier properties.

The reasons why when the PVA (C) is added, no cracks or like defects are caused and the gas barrier properties are improved are not clear but are presumably as follows. Thus, the particles of the EVOH (A) as obtained in the form of a dispersion are high in crystallinity, so that the particles of the EVOH (A) hardly fuse together or stick to one another on the occasion of low-temperature or short-time drying or thick application. As a result, there arises the possibility that cracks and like defects may be caused in the coatings and/or vacant spaces may remain among the particles of the EVOH (A) and allow the passage of gases, resulting in deteriorations in gas barrier properties. However, when the PVA (C) is added, such spaces among the particles of the EVOH (A) are filled with the PVA (C), by which cracks or like defects are prevented from being caused and gases are prevented from passing through the spaces otherwise remaining.

The aqueous EVOH dispersion of the invention may contain one or more of the ordinary surfactants and protective colloids as added according to need at levels which will not lead to failure in accomplishing the object of the invention. Further, an aqueous dispersion of another resin and/or one or more of stabilizers against light or heat, surface tension modifiers, antifoam agents, pigments, lubricants, antifungal agents and film-forming auxiliaries, among others, may also be added.

When it further contains an inorganic filler (D), the aqueous EVOH dispersion of the invention can provide coatings showing further improved gas barrier properties with good long-term stability. The reasons why the addition of an inorganic filler (D) can lead to coatings showing further improved gas barrier properties with good long-term stability are not clear but are presumably as follows. Thus, the excellent long-term storage stability is presumably due to the occurrence, in the above-mentioned aqueous EVOH dispersion, of the inorganic filler (D) in a stable state between the EVOH (A) and PVA (C) to thereby prevent the EVOH (A) and PVA (C) from aggregating. In the case of coatings, the further improvements in gas barrier properties of the coatings are presumably due to the filling, by the PVA (C), of not only the spaces among the particles of the EVOH (A), as mentioned above, but also the spaces between the inorganic filler (D) added and the particles of the EVOH (A), which results in an increased denseness of the coatings, and due to the maze effect fully obtained by the addition of the inorganic filler (D).

As the inorganic filler (D), there may be mentioned water-swellable phyllosilicates, talc, mica, clay, calcium carbonate and gypsum, among others. Among them, water-swellable phyllosilicates are preferably used. Specific examples thereof are smectite minerals such as montmorillonite, beidellite, nontronite, saponite, hectorite, sauconite and stevensite, and vermiculite. Among them, smectite minerals, in particular montmorillonite, are preferably used.

Desirably, the inorganic filler (D) has a particle diameter of 0.1-5 μm, preferably 0.1-2 μm, more preferably 0.3-2 μm. So long as the particle diameter is within the range of 0.1-5 μm, the inorganic filler (D) will not protrude from the coat surface even in the case of thin film application but dense films can readily be formed; in addition, the maze effect is fully produced in the coatings. In this way, the coatings can show high-level gas barrier properties.

Desirably, the inorganic filler (D) is used in an amount of 0.01-100 parts by weight, preferably 0.5-50 parts by weight, more preferably 0.5-20 parts by weight, per 100 parts by weight of the EVOH (A). When the inorganic filler (D) is used in an amount smaller than 0.01 part by weight per 100 parts by weight of the EVOH (A), any effect of the use thereof may not be expected. When the level of addition of the inorganic filler (D) exceeds 100 parts by weight per 100 parts by weight of the EVOH (A), the gas barrier performance improving effect can indeed be expected but the inorganic filler (D) itself, when dispersed in water, produces a liquid viscosity increasing effect and, therefore, the viscosity of the aqueous EVOH dispersion becomes excessively high, so that the storage stability of the liquid as a whole may be impaired due to the thickening effect of the inorganic filler (D) itself, which surpasses the dispersion stabilizing effect of the PVA (C).

The technique of adding the inorganic filler (D) is not particularly restricted but mention may be made, for example, of the technique comprising admixing an aqueous dispersion of the inorganic filler (D) with an aqueous EVOH dispersion comprising the other components with stirring; and the technique comprising admixing an aqueous dispersion of the inorganic filler (D) with an aqueous solution of the PVA (C) in advance and then admixing the mixture obtained with an aqueous dispersion of the EVOH (A). Among them, the technique comprising admixing an aqueous dispersion of the inorganic filler (D) with an aqueous solution of the PVA (C) in advance and then admixing the mixture obtained with an aqueous dispersion of the EVOH (A) is preferably used.

The solid matter concentration of the aqueous EVOH dispersion comprising the EVOH (A), base-neutralized ethylene/α,β-unsaturated carboxylic acid-based copolymer (B), PVA (C) and inorganic filler (D) is generally not lower than 10% by weight, preferably not lower than 15% by weight. Although there is no particular upper limit to the solid matter concentration, the storage stability of the dispersion may become reduced and the viscosity increased at excessively high concentrations and, therefore, that concentration is generally not higher than 50% by weight, preferably not higher than 40% by weight.

In the practice of the present invention, coatings or coat films can be formed on substrates by applying the above-mentioned aqueous EVOH dispersion onto the substrates, followed by drying.

The coatings formed from the aqueous EVOH dispersion generally have a thickness of 0.5-20 μm, preferably 0.5-18 μm. When the thickness of the coatings is less than 0.5 μm, the gas barrier properties may possibly be reduced by the formation of pinholes, for instance. Thicknesses of the coatings exceeding 20 μm are uneconomical.

As the substrates, there may be mentioned, for example, calendered or biaxially stretched films made of polyethylene, polypropylene, nylon, polyester, polycarbonate, polyvinylidene chloride, polystyrene or the like. In addition, there may be mentioned various molded articles other than the above-mentioned films, for example sheets, cups and bottles, fiber aggregates such as paper, nonwoven fabrics, woven fabrics and fibrous casings, inorganic substrates made of cement, for instance, metals, polyvinyl chloride resin-made wallpaper, photographic paper and so forth.

The technique for applying the aqueous EVOH dispersion of the invention to such substrates is not particularly restricted but any of the application methods known in the art, for example the casting head, roll coating, air knife coating, gravure roll coating, doctor roll coating, doctor knife coating, curtain flow coating, spray, dipping and brushing techniques, can be employed.

As the method for the drying and heat treatment of the substrates after application of the aqueous EVOH dispersion by such a technique as mentioned above, there may be mentioned, for example, the infrared irradiation, hot air drying and like dry heat treatment methods. The temperature for the above drying or heat treatment is desirably 30-230° C., preferably 50-160° C., more preferably 80-140° C. The drying/heat treatment time may vary depending on the temperature but is generally 5 seconds to 5 minutes, preferably 15 seconds to 1 minute.

An anchor coat agent may be applied in advance to the surface of the above-mentioned substrates. The anchor coat agent is not particularly restricted but may be, for example, a polyurethane- or polyester-based adhesive for dry lamination. The substrate surface may also be subjected to such surface treatment as corona discharge treatment, sputtering treatment, high-frequency treatment, flame treatment, chromate treatment or solvent etching treatment.

Furthermore, the laminate composed of such a substrate as mentioned above and a coat layer obtained from the aqueous EVOH dispersion of the invention may further be rendered multilayered in the manner of lamination with another resin layer by a method known in the art. As such lamination method, there may be mentioned the extrusion lamination method and dry lamination method, among others.

In carrying out such lamination, the ordinary method comprising carrying out the lamination with an adhesive resin layer between the layers may be employed.

The adhesive resin is not particularly restricted but may be any of those which will not cause delamination in the practical use, including, for example, carboxyl group-containing modified olefin polymers; glycidyl group-containing modified olefin polymers; alkoxysilane group-containing modified olefin polymers; and polyester resins derived from a polybasic carboxylic acid and a polyhydric alcohol or/and a hydroxycarboxylic acid as constituent elements.

More specifically, the adhesive resin includes carboxyl group-containing modified olefin polymers such as maleic anhydride graft-modified polyethylene, maleic anhydride graft-modified polypropylene, maleic anhydride graft-modified ethylene/ethyl acrylate copolymers and maleic anhydride graft-modified ethylene/vinyl acetate copolymers; glycidyl group-containing modified olefin polymers such as glycidyl-modified polyethylene, glycidyl-modified polypropylene, glycidyl-modified ethylene/ethyl acrylate copolymers and glycidyl-modified ethylene/vinyl acetate copolymers; alkoxysilane group-containing modified olefin polymers such as alkoxysilane-modified polyethylene, alkoxysilane-modified polypropylene and alkoxysilane-modified ethylene/vinyl acetate copolymers; and the like.

A laminate, which comprises a substrate and a coat layer, the coat layer is formed from the aqueous EVOH dispersion mentioned above, also constitutes an aspect of the present invention.

The coat layer formed from the aqueous EVOH dispersion, the substrate, and the method of laminate production are the same as described hereinabove. The laminate of the invention can be readily produced by any of the methods known in the art, as mentioned above, since the aqueous EVOH dispersion shows good film-forming ability even in thick coat layer formation.

The coat layer may be in direct contact with the substrate or another layer, for example the above-mentioned adhesive resin layer, may occur between the coat layer and the substrate. The coat layer may occur only on one side or on each of both sides of the substrate.

The laminate of the invention has a coat layer(s) formed from the aqueous EVOH dispersion mentioned above and, therefore, is excellent in gas barrier properties; thus, when the coat layer thickness is 15 μm, for instance, the laminate can generally show an oxygen permeability of not higher than 0.286 fm/Pa·s, preferably not higher than 0.229 fm/Pa·s. If the oxygen permeability of a laminate is not higher than 2.290 fm/Pa·s, the laminate can be judged to be excellent in gas barrier properties.

The oxygen permeability so referred to herein is measured under conditions of 20° C. and relative humidity of 85% using Ox-Tran 10/50A manufactured by Modern Controls, Inc.

The laminate of the invention is very suited for use as or in the form of a film, sheet or bag, a cup, tube, tray, bottle or like container, and in general food packaging, pharmaceutical packaging and retortable food packaging.

Effects of the Invention

The aqueous ethylene/vinyl alcohol-based copolymer dispersion of the invention is excellent in long-term storage stability and, even in the case of low-temperature or short-time drying or thick-layer coating, it shows good film-forming ability. It will not generate such a hazardous substance as an organic solvent in the process of application and drying thereof, and the coatings obtained show high-level gas barrier performance.

The laminate of the invention, which is derived from the aqueous ethylene/vinyl alcohol-based copolymer dispersion mentioned above, scarcely shows cracks in the coat layer and is excellent in gas barrier properties.

BEST MODE FOR CARRYING OUT THE INVENTION

The following examples and comparative examples illustrate the present invention in detail. These examples are, however, by no means limitative of the scope of the invention.

Example 1

To 100 parts by weight of an ethylene/acrylic acid copolymer (acrylic acid content 21% by weight, weight average molecular weight 41,000) were added 314 parts by weight of water and 12 parts by weight of sodium hydroxide just sufficient for 100 mole percent neutralization of acrylic acid moieties and, after 4 hours of stirring at 95° C. for dissolution of the copolymer, a neutralized aqueous ethylene/acrylic acid copolymer solution with a solid matter concentration of 25% by weight was obtained.

One hundred (100) parts by weight of a saponified ethylene/vinyl acetate copolymer (ethylene content 32 mole percent, degree of saponification 99.5 mole percent, degree of polymerization 1000), 855 parts by weight of isopropyl alcohol, 1045 parts by weight of water and 8 parts by weight of the neutralized aqueous ethylene/acrylic acid copolymer solution obtained in the above manner were mixed together and heated to 80° C. for dissolution and the solution was then cooled to 5° C. with stirring to thereby cause precipitation and dispersion of particles. The isopropyl alcohol was then distilled off to give an aqueous dispersion of a saponified ethylene/vinyl acetate copolymer with an average particle diameter of 0.15 μm and a solid matter concentration of 31% by weight.

Separately, 2400 parts by weight of water was added to 100 parts by weight of polyvinyl alcohol (degree of saponification 99.3 mole percent, degree of polymerization 1700), and the mixture was heated to 95° C. for dissolution and then cooled to room temperature to give an aqueous polyvinyl alcohol solution with a solid matter concentration of 4% by weight.

One hundred (100) parts by weight of the aqueous dispersion of a saponified ethylene/vinyl acetate copolymer (saponified ethylene/vinyl acetate copolymer content 31 parts by weight) obtained as described above and 78 parts by weight of the aqueous polyvinyl alcohol solution (polyvinyl alcohol content 3.12 parts by weight) obtained in the above manner were mixed up with stirring to give an aqueous dispersion of a saponified ethylene/vinyl acetate copolymer (saponified ethylene/vinyl acetate copolymer solid matter concentration 19% by weight) according to the invention. The aqueous dispersion of a saponified ethylene/vinyl acetate copolymer thus obtained was stored at 4° C. for 60 days. No aggregation was observed and the storage stability was good.

Example 2

One hundred (100) parts by weight of a saponified ethylene/vinyl acetate copolymer (ethylene content 29 mole percent, degree of saponification 99.5 mole percent, degree of polymerization 1000), 855 parts by weight of isopropyl alcohol, 1045 parts by weight of water and 8 parts by weight of the neutralized aqueous ethylene/acrylic acid copolymer solution obtained in Example 1 were mixed together and heated to 80° C. for dissolution and the solution was then cooled to 5° C. with stirring to thereby cause precipitation and dispersion of particles. The isopropyl alcohol was then distilled off to give an aqueous dispersion of a saponified ethylene/vinyl acetate copolymer with an average particle diameter of 0.18 μm and a solid matter concentration of 29% by weight.

Separately, 2125 parts by weight of water was added to 375 parts by weight of polyvinyl alcohol (degree of saponification 99.0 mole percent, degree of polymerization 300), and the mixture was heated to 95° C. for dissolution and then cooled to room temperature to give an aqueous polyvinyl alcohol solution with a solid matter concentration of 15% by weight.

One hundred (100) parts by weight of the aqueous dispersion of a saponified ethylene/vinyl acetate copolymer (saponified ethylene/vinyl acetate copolymer content 27 parts by weight) obtained as described above and 41 parts by weight of the aqueous polyvinyl alcohol solution (polyvinyl alcohol content 6.15 parts by weight) obtained in the above manner were mixed up with stirring to give an aqueous dispersion of a saponified ethylene/vinyl acetate copolymer (saponified ethylene/vinyl acetate copolymer solid matter concentration 25% by weight) according to the invention. The aqueous dispersion of a saponified ethylene/vinyl acetate copolymer thus obtained was allowed to stand at 40° C. for 60 days. No aggregation was observed and the storage stability was good.

Example 3

An aqueous dispersion of a saponified ethylene/vinyl acetate copolymer with an average particle diameter of 0.15 μm and a solid matter concentration of 31% by weight was obtained in the same manner as in Example 1.

Separately, 2400 parts by weight of water was added to 100 parts by weight of polyvinyl alcohol (degree of saponification 99.3 mole percent, degree of polymerization 1700), and the mixture was heated to 95° C. for dissolution and then cooled to room temperature to give an aqueous polyvinyl alcohol solution with a solid matter concentration of 4% by weight.

To the aqueous polyvinyl alcohol solution obtained was added 2500 parts by weight of an aqueous dispersion of montmorillonite with a solid matter concentration of 4% by weight and a particle diameter of 1.0 μm, as separately prepared, with stirring to give an aqueous polyvinyl alcohol solution containing the montmorillonite dispersed therein.

One hundred (100) parts by weight of the aqueous dispersion of a saponified ethylene/vinyl acetate copolymer (saponified ethylene/vinyl acetate copolymer content 31 parts by weight) obtained as described above and 78 parts by weight of the aqueous polyvinyl alcohol solution with the montmorillonite dispersed therein (montmorillonite content 1.56 parts by weight, polyvinyl alcohol content 1.56 parts by weight) obtained in the above manner were mixed up with stirring to give an aqueous dispersion of a saponified ethylene/vinyl acetate copolymer (saponified ethylene/vinyl acetate copolymer solid matter concentration 19% by weight) according to the invention. The aqueous dispersion of a saponified ethylene/vinyl acetate copolymer was stored at 40° C. for 90 days. No aggregation was observed and the storage stability was good.

Example 4

An acrylic anchor coat agent (trademark "SK-1000", Nippon Shokubai Co., Ltd.) was applied to the corona-treated surface of a biaxially oriented polypropylene film (product of Tohcello Co., Ltd., film thickness 20 μm) and then the aqueous dispersion of a saponified ethylene/vinyl acetate copolymer obtained in Example 1 was applied thereto by the air knife coating method, followed by 5 minutes of drying heat treatment at 110° C., which gave a laminate (EVOH layer thickness 15 μm) according to the invention. The EVOH layer of the laminate obtained showed no cracks or like defects.

The laminate obtained was measured for oxygen permeability using Ox-Tran 10/50A manufactured by Modern Controls, Inc. under conditions of 20° C. and relative humidity of 85%. The permeability was 0.126 fm/Pa·s.

Example 5

A laminate with an EVOH layer thickness of 10 μm was obtained in the same manner as in Example 4 except that the aqueous dispersion of a saponified ethylene/vinyl acetate copolymer obtained in Example 2 was used. The EVOH layer of the laminate obtained showed no cracks or like defects. The laminate obtained was measured for oxygen permeability in the same manner as in Example 4. The permeability was 0.194 fm/Pa·s.

Example 6

A laminate with an EVOH layer thickness of 15 μm was obtained in the same manner as in Example 4 except that the aqueous dispersion of a saponified ethylene/vinyl acetate copolymer obtained in Example 3 was used. The EVOH layer of the laminate obtained showed no cracks or like defects. The laminate obtained was measured for oxygen permeability in the same manner as in Example 4. The permeability was 0.080 fm/Pa·s.

Example 7

An acrylic anchor coat agent (trademark "SK-1000", Nippon Shokubai Co., Ltd.) was applied to the corona-treated surface of a biaxially oriented polypropylene film (product of Tohcello Co., Ltd., film thickness 20 μm) and then the aqueous dispersion of a saponified ethylene/vinyl acetate copolymer obtained in Example 1 was applied thereto by the air knife coating method, followed by 30 seconds of drying heat treatment at 110° C., upon which a laminate (EVOH layer thickness 15 μm) according to the invention was obtained. The EVOH layer of the laminate obtained showed no cracks or like defects. The laminate obtained was measured for oxygen permeability in the same manner as in Example 4. The permeability was 0.229 fm/Pa·s.

Example 8

A laminate with an EVOH layer thickness of 15 μm was obtained in the same manner as in Example 7 except that the aqueous dispersion of a saponified ethylene/vinyl acetate copolymer obtained in Example 3 was used. The EVOH layer of the laminate obtained showed no cracks or like defects. The laminate obtained was measured for oxygen permeability in the same manner as in Example 4. The permeability was 0.183 fm/Pa·s.

Comparative Example 1

An aqueous dispersion of a saponified ethylene/vinyl acetate copolymer (saponified ethylene/vinyl acetate copolymer solid matter concentration 31% by weight) was obtained in the same manner as in Example 1 except that the aqueous polyvinyl alcohol solution was not used. The aqueous dispersion of a saponified ethylene/vinyl acetate copolymer obtained was stored at 40° C. for 60 days; no aggregation was observed and the storage stability was good.

Separately, using the thus-obtained aqueous dispersion of a saponified ethylene/vinyl acetate copolymer, a laminate with an EVOH layer thickness of 15 μm was obtained in the same manner as in Example 4. The EVOH layer obtained showed a number of cracks.

Comparative Example 2

An aqueous dispersion of a saponified ethylene/vinyl acetate copolymer (saponified ethylene/vinyl acetate copolymer solid matter concentration 7% by weight) was obtained in the same manner as in Example 1 except that the aqueous polyvinyl alcohol solution was added in an amount of 852 parts by weight (polyvinyl alcohol content 34.1 parts by weight). The aqueous dispersion of a saponified ethylene/vinyl acetate copolymer obtained was stored at 40° C.; the viscosity increased and gelation occurred in 7 days.

Separately, using the thus-obtained aqueous dispersion of a saponified ethylene/vinyl acetate copolymer, a laminate with an EVOH layer thickness of 10 μm was obtained in the same manner as in Example 4. The EVOH layer of the laminate obtained showed no cracks or like defects. The laminate obtained was measured for oxygen permeability in the same manner as in Example 4. The permeability was 2.866 fm/Pa·s.

Comparative Example 3

An aqueous dispersion of a saponified ethylene/vinyl acetate copolymer (saponified ethylene/vinyl acetate copolymer solid matter concentration 19% by weight) was obtained in the same manner as in Example 1 except that the polyvinyl alcohol used had a degree of polymerization of 500 and a degree of saponification of 72.5 mole percent. The aqueous dispersion of a saponified ethylene/vinyl acetate copolymer obtained was stored at 40° C. for 60 days; no aggregation was observed and the storage stability was good.

Separately, using the thus-obtained aqueous dispersion of a saponified ethylene/vinyl acetate copolymer, a laminate with an EVOH layer thickness of 12 μm was obtained in the same manner as in Example 4. The EVOH layer of the laminate obtained showed no cracks or like defects. The laminate obtained was measured for oxygen permeability in the same manner as in Example 4. The permeability was 4.572 fm/Pa·s.

Comparative Example 4

An aqueous dispersion of a saponified ethylene/vinyl acetate copolymer (saponified ethylene/vinyl acetate copolymer solid matter concentration 19% by weight) was obtained in the same manner as in Example 1 except that the polyvinyl alcohol used had a degree of polymerization of 90 and a degree of saponification of 99 mole percent. The aqueous dispersion of a saponified ethylene/vinyl acetate copolymer obtained was stored at 40° C. for 60 days; no aggregation was observed and the storage stability was good.

Separately, using the thus-obtained aqueous dispersion of a saponified ethylene/vinyl acetate copolymer, a laminate with an EVOH layer thickness of 12 μm was obtained in the same manner as in Example 4. The EVOH layer obtained showed a number of cracks.

Comparative Example 5

An aqueous dispersion of a saponified ethylene/vinyl acetate copolymer (saponified ethylene/vinyl acetate copolymer solid matter concentration 19% by weight) was obtained in the same manner as in Example 1 except that the polyvinyl alcohol used had a degree of polymerization of 3700 and a degree of saponification of 99 mole percent. The aqueous dispersion of a saponified ethylene/vinyl acetate copolymer obtained was stored at 40° C.; the viscosity increased and gelation occurred in 14 days.

Separately, using the thus-obtained aqueous dispersion of a saponified ethylene/vinyl acetate copolymer, a laminate with an EVOH layer thickness of 13 μm was obtained in the same manner as in Example 4. The EVOH layer of the laminate obtained showed no cracks or like defects. The laminate obtained was measured for oxygen permeability in the same manner as in Example 4. The permeability was 0.137 fm/Pa·s.

INDUSTRIAL APPLICABILITY

The aqueous ethylene/vinyl alcohol-based copolymer dispersion of the invention can give coatings excellent in gas barrier properties, oil resistance and chemical resistance without impairing the excellent mechanical and chemical characteristics intrinsic in the resin and, therefore, can be used as or in various coating compositions, paint compositions, binders and vehicles, among others, for making the best use of such characteristics. More specifically, the dispersion can be used as an agent for providing food packaging materials with gas barrier properties and/or aroma retentivity, an antifouling agent for wallpaper; an agent for providing gasoline tanks or like molded articles, printed matter and the like with chemical resistance, solvent resistance and discoloration resistance; and an agent for providing steel pipes and other metal products with corrosion resistance, among others.

Further, the laminate of the invention is very suited for use in producing bags, cups, tubes, trays, bottles and other containers derivable from the laminate in a film or sheet form, among others, and for general food packaging, pharmaceutical packaging and retort food packaging.

The invention claimed is:

1. An aqueous ethylene/vinyl alcohol-based copolymer dispersion, which comprises:
   (A) ethylene/vinyl alcohol-based copolymer in the form of particles with an ethylene content of 15-65 mole percent and a degree of saponification of not lower than 80 mole percent,
   (B) a base-neutralized ethylene/α,β-unsaturated carboxylic acid-based copolymer and
   (C) a polyvinyl alcohol in solution with a degree of saponification of 75-100 mole percent and a degree of polymerization of 1700-3500,
   the content of the polyvinyl alcohol (C) being 0.5-100 parts by weight per 100 parts by weight of the ethylene/vinyl alcohol-based copolymer (A).

2. The aqueous ethylene/vinyl alcohol-based copolymer dispersion according to claim 1,
   which further comprises an inorganic filler (D).

3. The aqueous ethylene/vinyl alcohol-based copolymer dispersion according to claim 2,
   wherein the content of the inorganic filler (D) is 0.01-100 parts by weight per 100 parts by weight of the ethylene/vinyl alcohol-based copolymer (A).

4. The aqueous ethylene/vinyl alcohol-based copolymer dispersion according to claim 2,
   wherein the inorganic filler (D) is a water-swellable phyllosilicate.

5. A laminate,
   which comprises a substrate and a coat layer,
   the coat layer being formed from the aqueous ethylene/vinyl alcohol-based copolymer dispersion according to claim 1.

6. The aqueous ethylene/vinyl alcohol-based copolymer dispersion according to claim 3,
   wherein the inorganic filler (D) is a water-swellable phyllosilicate.

7. A laminate,
   which comprises a substrate and a coat layer,
   the coat layer being formed from the aqueous ethylene/vinyl alcohol-based copolymer dispersion according to claim 2.

8. A laminate,
   which comprises a substrate and a coat layer,
   the coat layer being formed from the aqueous ethylene/vinyl alcohol-based copolymer dispersion according to claim 3.

9. A laminate,
   which comprises a substrate and a coat layer,
   the coat layer being formed from the aqueous ethylene/vinyl alcohol-based copolymer dispersion according to claim 4.

10. The aqueous ethylene/vinyl alcohol-based copolymer dispersion according to claim 1,
    wherein content of the polyvinyl alcohol (C) is 0.5-50 parts by weight per 100 parts by weight of the ethylene/vinyl alcohol-based copolymer (A).

11. The aqueous ethylene/vinyl alcohol-based copolymer dispersion according to claim 1,
    wherein a solid matter concentration of the aqueous ethylene/vinyl alcohol-based copolymer dispersion is not higher than 50% by weight.

12. The aqueous ethylene/vinyl alcohol-based copolymer dispersion according to claim 1,
    wherein an average particle diameter of the ethylene/vinyl alcohol-based copolymer (A) in the form of particles is not greater than 1 μm.

\* \* \* \* \*